3,264,186
PROCESS FOR THE PURIFICATION OF GROWTH HORMONE

Alan J. Parcells, Portage, Mich., assignor to The Upjohn Company, Kalamazoo, Mich., a corporation of Delaware
No Drawing. Filed Feb. 26, 1964, Ser. No. 348,323
2 Claims. (Cl. 167—74)

This invention relates to a process of modifying pituitary gland products of known biological activity, more particularly, a process of modifying somatotrophic factors of mammalian pituitary glands.

It is known that mammalian pituitary glands, for example, human, ovine, bovine and porcine pituitaries, provide somatotrophic or growth factors which influence skeletal development and the growth and metabolism of many of the tissues of mammals. Such factors are useful in the treatment of pituitary insufficiency in mammals and in circumstances where hypophysectomy has been performed. However, because of their protein nature and large molecular size, the use of such factors where indicated means that in many cases undesirable foreign protein-like material of large molecular size is being administered to mammals, with the attendant dangers of protein and immunological reactions.

It has now been found that a process of chemically modifying these somatotrophic or growth factors yields substances with retained biological activity despite their chemically modified nature. Hence, the present invention provides a process of modifying pituitary principles known as somatotrophic or growth factors.

Generally described, the process involves reacting a growth hormone factor of mammalian pituitary glands with cyanogen bromide under controlled conditions to provide a modified growth hormone factor with retained biological activity. The starting material in the present process is prepared according to methods known in the art, for example, human growth hormone prepared by the procedure of Li and Papkoff, Science 124, 1293 (1956), and bovine growth hormone prepared by the procedure of Wilhelmi, J. Biol. Chem., 176, 737 (1948). The growth hormone factor is dissolved in aqueous solution at a pH of about 1.0 to about 3, using a strong acid, preferably HCl. The concentration of the hormone factor in the aqueous solution is not critical; however, it is preferred to use an approximately maximum concentration to avoid the necessity of handling large volumes, especially in the subsequent step for recovery of the growth hormone. Cyanogen bromide is added to this aqueous solution in the weight ratio of from about 2.5 to about 10 parts of the cyanogen bromide to 1 part of the hormone, preferably about 7 parts of cyanogen bromide. It has been found that a temperature range of about 20° C. to about 30° C. provides optimum results, although somewhat lower and higher temperatures are operable. Although the time of the reaction is not critical, it is preferred to use a time period of from about 2 to about 4 hours, especially since the reaction usually plateaus between about 4 hours and 16 hours. After the reaction has gone to essential completion as shown by N-terminal amino acid determinations and by the ratio of methionine residues to homoserine lactone residues, the cyanogen bromide and any excess acid used to adjust the pH are separated from the modified factor, for example, by exclusion chromatography and drying from the frozen state or by direct lyophilization. The modified growth factor is thereby recovered as an amorphous solid.

Biological assays of the modified factors show that biological activity is retained, whereas increases in N-terminal amino acids, reduction in methionine residues, and formation of homoserine lactone residues have occurred. It is evident from these biological and chemical data that retention of activity has occurred despite changes in chemical nature.

The following examples set forth how to perform the inventive process and the best mode contemplated of carrying out the invention but are not to be construed as limiting.

PREPARATION 1

*Modification of human growth hormone*

50 mgs. of human growth hormone prepared by the procedure of Li and Papkoff, Science 124, 1293 (1956), was dissolved in 7.5 mls. of 0.1 N hydrochloric acid. To this solution (pH 1.0) was added 0.25 gm. of cyanogen bromide with stirring. The reaction mixture was allowed to stand in the hood overnight at 25° C. The reaction mixture was then applied to a 2.8 x 40 cm. column of Sephadex G–25 which had been previously equilibrated with 0.1 N acetic acid. Sephadex G–25 is a cross-linked dextran gel available commercially from Pharmacia Fine Chemicals, Inc., Rochester, Minnesota, U.S.A. It has a water regain value of 2.5 gms. per gram of dry weight. (Per Flodin, "Dextran Gels and Their Applications," Meijels Bokindustri, Halmstad, Sweden, 1962.) The column was eluted with 0.1 N acetic acid at 0° C. and 3 ml. fractions were collected in test tubes. The contents of tubes 18 to 37 inclusive were pooled, the pH was adjusted to 5, and the adjusted solution was dialysed against purified water. The dialysed solution was frozen and dried from the frozen state, yielding 38.7 mgs. of modified somatotrophic factor.

The modified somatotrophic factor was assayed biologically by the radiosulfate-uptake method of Collins, Lyster and Carpenter, Acta Endocrinologica, 36, 51 (1961).

|  | No. of Rats | Total Dose/ Rat in mg. | Counts per min. per mg. |
|---|---|---|---|
| Untreated controls | 7 |  | 47.6 |
| Modified hormone | 7 | 12 | 73.0 |

PREPARATION 2

*Modification of bovine growth hormone*

100 mgs. of bovine growth hormone prepared by the procedure of Wilhelmi, J. Biol. Chem. 176, 737 (1948) and purified over cross-linked dextran gel (water regain value 7.5 gms. per gram, available commercially as Sephadex G–75 from Pharmacia Fine Chemicals, Inc., Rochester, Minnesota, U.S.A.) was dissolved in 15 mls. of 0.1 N hydrochloric acid. To this protein solution 0.25 gm. of cyanogen bromide was added with stirring. The reaction mixture was allowed to stand for 20 minutes at room temperature. Then the reaction mixture was applied to a 2.8 x 40 cm. column of Sephadex G–25 which had been previously equilibrated with 0.1 N acetic acid. Elution was carried out with 0.1 N acetic acid, and the first 170 mls. of eluate was frozen and dried from the frozen state. The yield of modified growth hormone was 85.4 mgs.

Biological assay data was obtained by the radiosulfate-uptake assay of Collins, Lyster and Carpenter, Acta Endocrinologica 36, 51 (1961). The results were as follows:

|  | No. of Rats | Total Dose/ Rat in mg. | Counts per min. per mg. |
|---|---|---|---|
| Untreated controls | 7 |  | 18.4 |
| Modified hormone | 7 | 24 | 75.1 |

PREPARATION 3

*Modification of human growth hormone*

85 mgs. of human growth hormone prepared by the method of Li, Liu and Dixon, Arch. Biochem. Biophys.

Suppl. 1, 327 (1962) was dissolved in 17 ml. of 0.1 N HCl. To this solution was added a solution of 570 mgs. of cyanogen bromide in 17 mls. of 0.1 N HCl. The reactoin proceeded for 2 hours at about 25° C. The reaction mixture was applied to a 1.9 x 110 cm. column of Sephadex G-25 previously equilibrated with 0.1 N acetic acid. Elution was carried out with the 0.1 N acetic acid, and 3 ml. fractions of eluate were collected in test tubes. The contents of tubes 34–58 were pooled and dialysed against purified water U.S.P. The dialysed solution was lyophilized to yield 74.2 mgs. of modified hormone.

Biological activity was retained as shown by the following assays using the tibia width method of Geschwind and Li, "The Hypophyseal Growth Hormone," p. 28, 1955, Blakeston, N.Y.

|  | No. of Rats | Total Dose in mg. | Tibia Width (Micra) |
|---|---|---|---|
| Untreated controls | 7 | ---- | 189 |
| Modified hormone | 7 | 20 | 231 |
|  | 7 | 80 | 282 |
|  | 7 | 320 | 291 |
| Untreated controls | 6 | ---- | 157 |
| Unmodified hormone of Li method. | 6 | 20 | 251 |
|  | 7 | 80 | 257 |
|  | 6 | 320 | 318 |
| Unmodified hormone of National Institutes of Health (U.S.). | 5 | 20 | 229 |
|  | 7 | 80 | 273 |
|  | 6 | 320 | 305 |

EXAMPLE 1

*N-terminal amino acid data—bovine growth hormones*

The data on typical preparations are expressed as $\mu$moles per 51 mg. of dinitrophenyl-protein.

|  | Unmodified | Modified |
|---|---|---|
| Alanine | 0.72 | 0.119 |
| Phenylalanine | 0.415 | 0.099 |
| Glutamic plus aspartic acids | 0 | 0.018 |
| Valine | 0 | 0.018 |
| Leucine | 0 | 0.022 |

EXAMPLE 2

*N-terminal amino acid data—human growth hormones*

The data on typical preparations are expressed as $\mu$moles per 28 mg. of dinitrophenyl-protein.

|  | Unmodified | Modified |
|---|---|---|
| Threonine | 0.031 | 0 |
| Phenylalanine | 0.570 | 0.062 |
| Glutamic acid | 0.019 | 0 |
| Leucine | 0 | 0.122 |
| Glycine | 0 | 0.023 |
| Glutamic plus aspartic acids | 0 | 0.066 |

EXAMPLE 3

*Amino acid compositions—bovine growth hormones*

The data on typical preparations are expressed as amino acid residues per mole of protein.

|  | Unmodified | Modified |
|---|---|---|
| Lysine | 23 | 23 |
| Histidine | 7 | 7 |
| Arginine | 26 | 24 |
| Aspartic acid | 34 | 34 |
| Threonine | 25 | 24 |
| Serine | 27 | 23 |
| Glutamic acid | 51 | 50 |
| Proline | 14 | 13 |
| Glycine | 22 | 21 |
| Alanine | 30 | 27 |
| Cystine/2 | 8 | 5 |
| Valine | 14 | 14 |
| Methionine | 8 | 4 |
| Isoleucine | 14 | 14 |
| Leucine | 54 | 55 |
| Tyrosine | 12 | 13 |
| Phenylalanine | 25 | 24 |
| Homoserine lactone | 0 | 0.6 |
| Homoserine | 0 | 1.1 |

EXAMPLE 4

*Amino acid compositions—human growth hormones*

The data on typical preparations are expressed as amino acid residues per mole of protein.

|  | Unmodified | Modified |
|---|---|---|
| Lysine | 13 | 15 |
| Histidine | 5 | 5 |
| Arginine | 14 | 13 |
| Aspartic acid | 27 | 24 |
| Threonine | 14 | 14 |
| Serine | 23 | 21 |
| Glutamic acid | 34 | 34 |
| Proline | 12 | 11 |
| Glycine | 13 | 13 |
| Alanine | 12 | 12 |
| Cystine/2 | 6 | 1 |
| Valine | 12 | 12 |
| Methionine | 4 | 1 |
| Isoleucine | 10 | 8 |
| Leucine | 31 | 27 |
| Tyrosine | 10 | 9 |
| Phenylalanine | 15 | 13 |
| Homoserine lactone | 0 | 1 |
| Homoserine | 0 | 0.6 |

What is claimed is:

1. In a process of preparing growth hormone the steps of reacting a somatotrophic factor of mammalian pituitary with from about 2.5 to about 10 parts by weight of cyanogen bromide in aqueous solution at a pH of from about 1 to about 3 for from about ½ to about 16 hours at a temperature of from about 20° to about 30° C. and recovering the growth hormone from the reaction mixture.

2. In a process of preparing growth hormone the steps of reacting a somatotrophic factor of mammalian pituitary with about 7 parts by weight of cyanogen bromide at pH about 1 for from about 2 to about 4 hours at a temperature of from about 20° to about 30° C. and recovering the growth hormone from the reaction mixture.

No references cited.

JULIAN S. LEVITT, *Primary Examiner.*

LEROY B. RANDALL, *Assistant Examiner.*